United States Patent Office 2,939,880
Patented June 7, 1960

2,939,880

ALKOXY-HYDROXY SUBSTITUTED CARBOXYLIC ACIDS AND THEIR ESTERS AND PRODUCTION THEREOF

Amelio E. Montagna, South Charleston, W. Va., Donald G. Kubler, Columbia, S.C., and Julius J. Brezinski, St. Albans, W. Va., assignors to Union Carbide Corporation, a corporation of New York No Drawing. Filed Nov. 19, 1958, Ser. No. 774,821

25 Claims. (Cl. 260—484)

The present invention relates to processes for producing organic compounds, and is especially concerned with processes for the production of certain novel alkoxy-hydroxy-substituted aliphatic carboxylic acids and carboxylic acid esters.

More particularly, the novel carboxylic acids and carboxylic acid esters produced in accordance with the processes of this invention can be represented by the general formula:

(I)
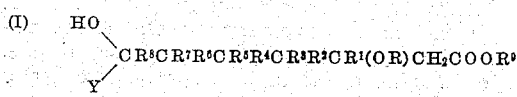

wherein R designates an alkyl radical containing from 1 to about 18 carbon atoms; each $R^1$ to $R^8$ respectively designates a member of the class consisting of hydrogen and the lower alkyl radicals containing from 1 to about 4 carbon atoms; $R^9$ designates a member of the class consisting of hydrogen and the alkyl radicals containing from 1 to about 18 carbon atoms; and Y designates a member of the class consisting of hydrogen, the lower alkyl radicals containing from 1 to about 4 carbon atoms, the carbalkoxy radicals containing from 2 to about 19 carbon atoms and the carboxylic acid radical. By way of illustration, R can be a methyl, ethyl, isopropyl, buty, hexyl, 2-ethylhexyl, decyl, tetradecyl or octadecyl radical, and the like; each $R^1$ to $R^8$ respectively can be hydrogen or a methyl, ethyl, propyl, isopropyl, butyl or isobutyl radical, and the like; $R^9$ can be hydrogen or a methyl, ethyl, isopropyl, butyl, hexyl, 2-ethylhexyl, decyl, tetradecyl or octadecyl radical, and the like; and Y can be hydrogen or a methyl, ethyl, propyl, isopropyl, butyl, isobutyl, carbomethoxy, carbethoxy, carbobutoxy, carbohexoxy, carbo-2-ethylhexoxy, carbodecyloxy, carbotetradecyloxy, carboctadecyloxy, or carboxylic acid radical, and the like. Thus when Y designates hydrogen, the products of this invention are derivatives of and include 3-alkoxy-7-hydroxyheptanoic acids; when Y represents an alkyl radical, the products of this invention are derivatives of and include 3-alkoxy-7-hydroxyalkanoic acids; and when Y designates a radical of the class consisting of the carbalkoxy and carboxylic acid radicals, the products of this invention are derivatives of and include 2-hydroxy-6-alkoxyoctanedioic acids.

In the broadest aspect, the processes of this invention contemplate the production of the novel carboxylic acids and carboxylic acid esters described herein from starting materials comprising polymeric ester compositions formed substantially of recurring units represented by the general formula:

(II)
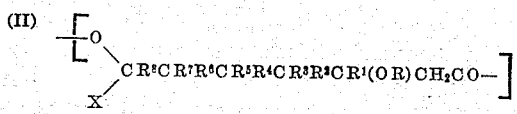

wherein R and $R^1$ to $R^8$ are as defined above and X designates a member of the class consisting of hydrogen, the lower alkyl radicals containing from 1 to about 4 carbon atoms and the carbalkoxy radicals containing from 2 to about 9 carbon atoms. As provided by the invention, these polymeric ester compositions are subjected to either saponification and acidification or to transesterification, depending upon whether a carboxylic acid or carboxylic acid ester product is desired. In addition, the carboxylic acid esters of this invention can also be prepared from the corresponding novel carboxylic acids by direct esterification.

The polymer ester compositions found suitable for use as starting materials in the processes of this invention are obtained in accordance with the processes described in copending application Serial No. 517,074, filed June 21, 1955, now issued as U.S. Patent 2,876,239, of which the present application is a continuation-in-part. More specifically, the polymeric ester compositions are produced by reacting ketene with a 2-alkoxytetrahydropyran or substituted 2-alkoxytetrahydropyran represented by the general formula:

(III)
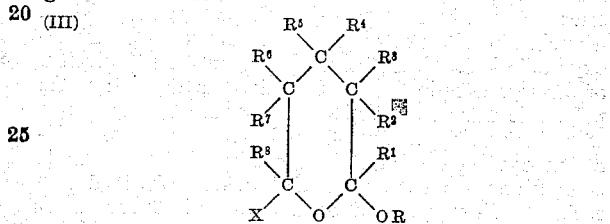

wherein R, $R^1$ to $R^8$ and X are as defined above, at a reaction temperature within the range of from $-80°$ C. to $100°$ C. and in the presence of an acidic catalyst. The polymeric ester compositions are recovered as thick liquid products having viscosities of about 1,000 centistokes or higher at a temperature of $100°$ C. and molecular weights of from about 325 to about 3,000 and higher, and can subsequently be employed as herein described for the production of the novel carboxylic acids and carboxylic acid esters of this invention.

Illustrative of the broad range of polymeric ester compositions found useful as starting materials in the processes of this invention there can be mentioned the following, although others can also be employed:

Polymeric esters of:
3-ethoxy-7-hydroxyheptanoic acid,
3-methoxy-7-hydroxyheptanoic acid,
3-[2-ethylhexoxy]-7-hydroxyheptanoic acid,
3-ethoxy-4-ethyl-5-methyl-7-hydroxyheptanoic acid,
3-ethoxy-5-methyl-7-hydroxyheptanoic acid,
3-ethoxy-6-butyl-7-hydroxyheptanoic acid,
3-butoxy-3-methyl-7-hydroxyheptanoic acid,
3-ethoxy-5-methyl-7-hydroxyheptanoic acid,
3-ethoxy-6-butyl-7-hydroxyheptanoic acid,
3-butoxy-3-methyl-7-hydroxyheptanoic acid,
3-butoxy-5-propyl-7-hydroxyheptanoic acid,
3-[2-ethylhexoxy]-5-isopropyl-7-hydroxyheptanoic acid,
3-ethoxy-4,6-diethyl-5-propyl-7-hydroxyheptanoic acid,
3-ethoxy-7-hydroxyoctanoic acid,
3-ethoxy-7-carbethoxy-7-hydroxyheptanoic acid,
3-butoxy-7-carbobutoxy-7-hydroxyheptanoic acid,
3-butoxy-4,7-dimethyl-7-carbobutoxy-7-hydroxyheptanoic acid,
3-[2-ethylhexoxy]-4,7-dimethyl-7-carbo-2-ethylhexoxy-7-hydroxyheptanoic acid, and the like.

In an embodiment of the invention, when a carboxylic acid product is desired, the polymeric ester composition is admixed with an alkaline saponification agent, generally in the presence of an amount of water sufficient to dissolve the saponification agent and to keep the resulting product in solution. The reaction mixture is then refluxed at a temperature up to about 120° C. In this manner, the polymeric ester composition is converted to a monomeric alkaline carboxylic acid salt. Recovery of the desired carboxylic acid product is thereafter accomplished through the acidification of the alkaline reaction mixture, followed by the extraction of the acid from the acidified mixture with a suitable organic solvent or by separation therefrom in any other convenient manner.

Of the alkaline saponification agents, an aqueous alkali metal hydroxide solution such as an aqueous solution of sodium hydroxide, potassium hydroxide or lithium hydroxide, engenders particularly efficient results in accordance with the invention, although other alkaline saponification agents can also be utilized. Moreover, as the saponification is generally carried out in an aqueous medium, the use of a water-soluble alkaline saponification agent is preferred.

The saponification ordinarily employs about one equivalent of the saponification agent for each ester linkage present in the polymeric ester composition undergoing reaction. For example, the saponification of polymeric ester compositions represented above by Formula II, wherein X designates a substituent other than a carbalkoxy radical, involves the use of about one equivalent of the saponification agent for each recurring unit of the polymeric ester composition; and when X designates a carbalkoxy radical, about 2 equivalents of the saponification agent for each recurring unit of the polymeric composition are employed. It has been observed that each ester linkage present in the polymeric ester composition is capable of undergoing saponification and can subsequently be acidified to a carboxylic acid function. Thus, when X designates a carbalkoxy radical, a dicarboxylic acid as represented above by Formula I, wherein $R^9$ designates hydrogen and Y designates a carboxylic acid radical, is ultimately produced. In addition, it has been found preferable during the saponification to have a slight excess of the saponification agent present, e.g., about a 5 percent excess by weight, in order to insure a more complete saponification. Little commensurate advantage, however, can be expected by the use of a further excess of the saponification agent, while the use of lesser quantities than those indicated above ordinarily results in the realization of diminished product yields or products containing incompletely saponified products.

Because of the generally poor water-solubility of the polymeric ester compositions, it is desirable, although not essential, to employ an inert water-soluble solvent for the polymeric ester composition during the saponification. By the use of such a solvent, the resulting rate of saponification is considerably enhanced. Moreover, greater control can thereby be exercised over the temperature of reaction. It is also expedient to employ a solvent which can readily be removed from the reaction mixture after saponification by distillation. Typical of the inert water-soluble solvents found suitable for use in the invention there can be mentioned tetrahydrofuran, dioxane, ethylene glycol dimethyl ether, the water-soluble alkyl alcohols and the like, although others can also be employed.

In particular, when the polymeric ester composition undergoing reaction is one in which the alkoxy substituent contains an alkyl radical, designated above in Formula II by R, the corresponding alcohol of which is water-soluble, any alkyl alcohol employed as a solvent for the polymeric ester composition during the saponification is preferably one containing a similar alkyl radical. In this manner, the possibility of forming mixtures of carboxylic acid products in which the alkoxy substituent has been exchanged so as to include more than one type of alkyl linkage is precluded.

The amount of water-soluble solvent to be utilized in the saponification will vary depending, for example, upon the solubility therein of the polymeric ester composition as well as the solubility of the solvent in any water present, and can readily be determined by one skilled in the art. Preferably, the solvent is incorporated in the reaction mixture in an amount sufficient to effect a homogeneous reaction mixture. As heretofore noted, however, the use of a water-soluble solvent for the polymeric ester composition is not critical to the invention. Accordingly, in the absence of such a solvent, it becomes especially important to provide adequate agitation to the reaction mixture during the saponification in order to prevent superheating and the attendant disadvantages described below.

The temperature at which the saponification is carried out is of prime importance to the production of the carboxylic acids of this invention. In this respect, it is essential that the temperature of the reaction mixture at no time be allowed to rise substantially above 120° C. either during the saponification or while the reaction mixture is strongly alkaline. At such elevated temperatures, for example, extensive dealcoholation and cyclization of the polymeric ester composition and of the carboxylic acid product has been found to occur. Thus, both the yield and recovery of the desired product is disadvantageously affected. The operative temperature range for the saponification is from about 30° C. to about 120° C., with best results being realized using reaction temperatures of from about 70° C. to 100° C. Further, within these temperature ranges, the saponification is ordinarily carried out at atmospheric pressure, although somewhat higher or lower pressures can also be employed.

Upon completion of the saponification, any water-soluble solvent contained in the reaction mixture can be removed by distillation or other suitable means. The remaining alkaline carboxylic acid salt is then acidified, preferably by reaction with a mineral acid such as sulfuric, hydrochloric or phosphoric acid, thereby converting the carboxylic acid salt to the corresponding carboxylic acid.

The acid employed in the acidification is preferably introduced to the reaction mixture in dilute aqueous solution and admixed therewith in an amount of acid equivalent to the amount of saponification agent previously utilized for the saponification. The introduction of acid can be effected at a temperature of between about 0° C. and 100° C., with particularly efficient results being obtained by maintaining the temperature of the reaction mixture in the range of between 15° C. and 50° C. during the acidification. The desired carboxylic acid product can then be separated from the acidified mixture, as for example, by extraction with a suitable organic solvent such as diethyl ether, and recovered from the extract by distillation. Other convenient means of separation can also be employed.

When a carboxylic acid ester product is instead desired, the corresponding carboxylic acid, obtained as described above, can be subjected to direct esterification. The direct esterification is carried out by admixing the carboxylic acid with an alkyl alcohol and refluxing the reaction mixture at a temperature up to about 120° C., in the presence of a catalytic amount of an acidic direct esterification catalyst, while removing the water of esterification formed during the course of reaction. It is also desirable to incorporate in the reaction mixture an entrainer such as benzene, diisopropyl ether or the like, to assist in the removal of the water of esterification.

The alkyl alcohols found suitable for use in the direct esterification include those containing from 1 to about 18 carbon atoms and particularly from 1 to about 8 carbon atoms. Of these, the use of an alcohol in which the alkyl radical is identical with the alkyl radical of the alkoxy substituent on the carboxylic acid undergoing reaction, designated above in Formula I by R, is preferred. The possibility of forming mixtures of carboxylic acid ester products wherein the alkoxy substituent has been exchanged so as to include more than one type of alkyl radical is thereby obviated. Typical of the alcohols which can be employed in the direct esterification there can be mentioned methanol, ethanol, n-propanol, isobutanol, 2-ethylhexanol, decanol, tetradecanol, octadecanol and the like, although other alkyl alcohols can also be utilized.

The alkyl alcohol is generally admixed with the carboxylic acid in an amount at least equal to the stoichiometric amount required for the direct esterification. Thus, with a monocarboxylic acid, at least one mol of alcohol per mol of acid is preferably employed, while a dicarboxylic acid is preferably reacted with at least 2 mols of alcohol per mol of acid. In particular, it has been found desirable to incorporate the alcohol in the reaction mixture in about a 5 to about a 10 mol excess of the stoichiometric amount required for reaction. The excess alcohol serves both as a solvent for the carboxylic acid reactant and to limit any polymerization which may occur due to the presence of the hydroxyl substituent on the carboxylic acid. Higher conversions to the desired carboxylic acid ester product are therefore possible. Less than stoichiometric quantities of alkyl alcohol can also be utilized in the direct esterification, accompanied, however, by the formation of decreased product yields.

The catalyst used for the direct esterification is preferably a mineral acid such as sulfuric acid, although any other acidic direct esterification catalyst can be employed. Especially good results can be obtained in this respect when the catalyst is present in the reaction mixture in a concentration of from about 0.1 to about 0.5 percent by weight of the reactants, with concentrations of catalyst of from about 0.05 to about 1.0 percent by weight of the reactants and higher also permitting satisfactory conversions to the desired carboxylic acid ester product.

The operative and preferred temperatures and pressures to be employed in the direct esterification are essentially the same as those described above in connection with the saponification process. Particularly, it is to be pointed out that, as in the saponification process, it is critical that the temperature of the reaction mixture not be allowed to rise substantially above 120° C. during the direct esterification in order to prevent the dealcoholation and cyclization of the carboxylic acid reactant or the carboxylic acid ester product from occurring.

Upon completion of the direct esterification, the acidic catalyst is neutralized by the addition of an alkaline compound such as sodium ethoxide or the like. The carboxylic ester product can thereafter be recovered from the reaction mixture by distillation or in any other suitable manner.

Advantageously, a more direct and convenient process for the production of the carboxylic acid esters of this invention has been found to lie in the transesterification of the polymeric ester compositions represented above by Formula II. The tranesterification reaction is carried out by admixing the polymeric ester composition with an alkyl alcohol and refluxing the reaction mixture at a temperature of up to about 150° C., in the presence of catalytic amounts of a basic transesterification catalyst. Anhydrous conditions are generally maintained during this procedure. Recovery of the desired carboxylic acid ester can then be effected by the neutralization of the basic catalyst followed by the distillation of the neutralized reaction mixture or by separation therefrom in any other convenient manner.

The alkyl alcohols found suitable for use in the transesterification are the same as those described above in connection with the direct esterification process. In addition, the alcohol is preferably one possessing the same alkyl radical as that contained in the alkoxy substituent of the polymeric ester composition undergoing reaction, designated above in Formula II by R. Thus, the production of mixed carboxylic acid ester products containing more than one type of alkoxy substituent is inhibited.

The alkyl alcohol is ordinarily admixed with the polymeric ester composition in an amount at least equal to the stoichiometric amount required for reaction. For example, the transesterification of polymeric ester compositions represented above by Formula II, wherein X designates a substituent other than a carbalkoxy radical, involves the use of at least one mol of alcohol for each recurring unit of the polymeric ester composition; and when X designates a carbalkoxy radical, also capable of undergoing transesterification, at least two mols of alcohol for each recurring unit of the polymeric ester composition are employed. In addition, it has been found desirable to incorporate the alcohol in the reaction mixture in about a 5 to about a 10 mol excess of the stoichiometric amount required for reaction. The excess alcohol serves both as a solvent for the polymeric ester composition undergoing reaction and to limit any polymerization which may occur due to the presence of the hydroxyl substituent on the polymeric ester composition. Higher conversions to the desired carboxylic acid ester product are therefore possible. Less than stoichiometric amounts of alcohol can also be utilized, resulting, however, in the recovery of diminished product yields or incompletely tranesterified products.

While any basic tranesterification catalyst can be employed in accordance with this invention, particularly efficient results can be achieved using alkali metal alkoxides such as sodium-, potassium-, and lithium alkoxides as the catalyst. Moreover, for similar reasons to that described above, the catalyst is preferably selected from among those in which the alkyl radical is the same as that contained in the alkoxy substituent of the polymeric ester composition undergoing reaction, designated above in Formula II by R.

The concentration of tranesterification catalyst to be employed is not critical to the invention. Thus, for example, catalyst concentrations of from about 0.1 to about 5.0 percent by weight of the polymeric ester composition or higher can be utilized, with concentrations of from about 0.5 to about 1.0 percent by weight of the polymeric ester composition being preferred.

The operative temperature range for the transesterification is from about 70° C. to about 150° C., with reaction temperatures of from about 120° C. to about 150° C., being preferred. At temperatures of between about 120° C. and about 150° C. some small degree of dealcoholation and cyclization of the polymeric ester composition and of the carboxylic acid ester product has been found to occur, forming side-products representing up to about 10 percent by weight of the total product. It is essential, however, that the temperature of the reaction mixture at no time be allowed to rise substantially above 150° C., either during the transesterification or while the reaction mixture is alkaline. At such elevated temperatures, for example, extensive dealcoholation and cyclization of the polymeric ester composition and the carboxylic acid ester product has been found to occur, considerably diminishing the yield of the desired product and rendering the recovery of the product more inconvenient.

Within the operative temperature range, the transesterification is generally carried out at atmospheric pressure. Somewhat higher or lower pressures, however, can also be used with satisfaction. For instance, when the use of super-atmospheric pressure is desired in order to attain a sufficiently high reaction temperature, particularly good results can be realized by carrying out the transesterification in a closed system at pressures of up to about 150 p.s.i.g., or slightly higher.

The basic catalyst employed in the transesterification is preferably neutralized upon completion of the reaction prior to the removal of any alcohol present. Thus, isolation of the desired product by distillation at a reduced pressure can be achieved unattended by the dealcoholation and cyclization of the product. The neutralization can be effected by the addition of a mineral acid such as concentrated sulfuric acid or gaseous hydrogen chloride to the reaction mixture or in any other convenient manner. Any salt precipitated upon neutralization can be removed by filtration.

After transesterification, the reaction mixture is distilled to remove any alcohol present and to recover the carboxylic acid ester product. During distillation, any side-products formed by dealcoholation and cyclization can also be removed, there generally being a sufficient difference in boiling points with the desired product. Other convenient means of separation can also be utilized.

The novel alkoxy-hydroxy-substituted carboxylic acids and carboxylic acid esters produced in accordance with the processes of this invention find suitable utility as precursors for the production of various film-forming polymers as well as resinous plasticizers. For example, compounds of the type represented above by Formula I, wherein Y designates hydrogen or an alkyl radical, can be reacted with an excess over an equimolar quantity of an aliphatic diol such as 1,6-hexanediol in accordance with either conventional esterification or transesterification reactions, depending upon whether a carboxylic acid or carboxylic acid ester product is employed as a starting material, so as to form predominantly a dihydroxy monoester intermediate. This intermediate can then be esterified with a dibasic carboxylic acid such as adipic acid under conventional conditions to produce polymeric esters suitable for use as plasticizers for vinyl resins. The same carboxylic acid or carboxylic acid esters of this invention can also be reacted with an aliphatic aminoalcohol such as 4-aminobutanol under conventional conditions of elevated temperature for the production of carboxylic acid amides so as to form a dihydroxy monoamide intermediate. In turn, this intermediate can be esterified with a dibasic carboxylic acid such as adipic acid, thus obtaining polymeric ester amides suitable for use as plasticizers for vinyl resins. In a similar manner to that described above, the carboxylic acid and carboxylic acid esters of this invention represented above by Formula I, wherein Y represents a carbalkoxy or carboxylic acid radical, can be reacted with an aliphatic diol such as 1,6-hexanediol or an aliphatic diamine such as 1,6-hexanediamine so as to form polymeric esters and polymeric ester amides. As well as being suitable for use as surface coating and as plasticizers for vinyl resins, these latter polymeric products are also suitable for the production of films due to a certain degree of cross-linking that occurs through the reaction of the hydroxyl radical of the carboxylic acid or carboxylic acid ester. Moreover, the presence of alkoxy radicals in each of the polymeric products indicated above can enhance the compatibility of the polymers with many vinyl resins when they are employed as plasticizers.

In addition, the carboxylic acids and carboxylic acid esters of this invention can be employed as precursors for the production of various carboxylic acid and carboxylic acid ester derivatives of tetrahydropyran including alkyl-substituted tetrahydropyrans, represented by the general formula:

(IV)

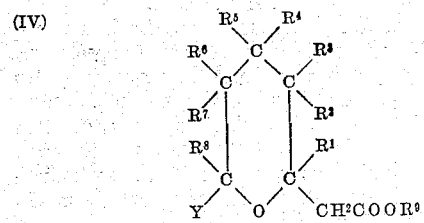

wherein $R^1$ to $R^9$ and Y are as defined above. Thus, for example, where a carboxylic acid derivative of tetrahydropyran is desired, the carboxylic acids or carboxylic acid esters of this invention can be saponified, as by reaction with sodium hydroxide, and the alkaline saponified product subjected to a temperature sufficiently high as to effect the dealcoholation and cyclization of the saponified product. Generally, reaction temperatures of from about 130° C. to about 150° C. have proven satisfactory in this respect. The desired carboxylic acid ester derivative of tetrahydropyran can thereafter be obtained upon acidification of the resulting product. Alternatively, when a carboxylic acid ester derivative of tetrahydropyran is desired, the carboxylic acid esters of this invention can be admixed with an alkyl alcohol and a basic substance such as a sodium alkoxide, and the mixture subjected to a temperature sufficiently high so as to effect dealcoholation and cyclization of the carboxylic acid ester. For instance, reaction temperatures of from about 175° C. to about 200° C. can be utilized. Moreover, with an appropriate alkyl alcohol, transesterification of the product can simultaneously be accomplished. The production of these tetrahydropyran derivatives, many of which find utility as plasticizers for vinyl resins as well as in numerous other applications, is made possible due to the presence of the alkoxy and hydroxy substituents at the 3- and 7-positions respectively of the carboxylic acids and carboxylic acid esters of this invention. Were these substituents to be present at any other positions of the molecules, the production of tetrahydropyran derivatives as herein described could not be carried out.

The processes of this invention can be illustrated further in connection with the following specific examples of its practice.

*Example 1*

To 651 grams (4.9 mols) of 2-ethoxytetrahydropyran, cooled to a temperature of —10° C., there were added 20.3 cc. of a 32 percent solution of boron trifluoride in diethyl ether. Eighty-seven grams (2.1 mols) of ketene were then bubbled into the solution at a rate of 17.4 grams per hour, while maintaining the reaction mixture at a temperature between —9° C. and +1° C.

Upon the complete addition of ketene, the acidic catalyst was neutralized by the addition of aqueous sodium acetate and the crude reaction product diluted further with 1100 cc. of diisopropyl ether. The organic layer thereby formed was separated and extracted with water to remove the inorganic salts present. The amount of ketene absorbed during the reaction was found to be 71 grams (1.7 mols). The organic product was then stripped of water and diisopropyl ether, after which 231 grams (1.75 mols) of unreacted 2-ethoxytetrahydropyran was removed by distillation at a temperature of 185° C., under 2 mm. of mercury pressure. The residual product, a polymeric ester composition, was recovered in a 285-gram yield as a viscous, light-yellow oil and had the following properties: saponification equivalent: 174 (theory: 172); viscosity at a temperature of 100° C.: 1492 centistokes; average molecular weight: 1600; elemental analysis in percent by weight:

| | Found | Calculated for $(C_9H_{16}O_3)_x$ |
|---|---|---|
| C | 62.8 | 62.7 |
| H | 9.4 | 9.4 | indicating a recurring unit structure for the polymeric ester composition represented by the general formula:

$$(-OCH_2CH_2CH_2CH_2CH(OC_2H_5)CH_2\overset{O}{\overset{\|}{C}}-)_x$$

wherein $x$ has an average value of 9.3 as calculated from the determination of average molecular weight.

*Example 2*

A solution containing 172 grams of a polymeric ester composition having an average molecular weight of 1420 and formed of recurring units represented by the general formula:

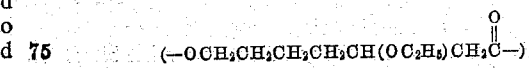

70.1 grams (1.25 mols) of potassium hydroxide, 400 cc. of ethanol and 200 cc. of water was refluxed for a period of 11 hours at a temperature of about 80° C. The polymeric ester composition employed in the reaction had been produced by the reaction of 2-ethoxytetrahydropyran and ketene essentially as described above in Example 1. Upon completion of the reflux period, the reaction mixture was stripped of ethanol and the residual solution acidified by the addition of 64 grams of concentrated sulfuric acid. The acidified solution was extracted with three 300-cc. portions of diethyl ether and the ether extracts combined and dried over sodium sulfate. The combined extracts were then filtered and stripped of ether. The residual product, 3-ethoxy-7-hydroxyheptanoic acid, was recovered in a 135-gram yield as a pale-orange, viscous liquid and had the following property: neutralization equivalent: 194 (theory: 190).

A solution containing 106 grams (0.55 mol) of the 3-ethoxy-7-hydroxyheptanoic acid product described above, 253 grams (5.5 mols) of ethanol, 100 cc. of diisopropyl ether and 0.5 percent sulfuric acid by weight of the reactants was refluxed at a temperature of about 80° C. Upon completion of the reaction, as indicated by a cessation of water formation, the acid catalyst was neutralized by the addition of aqueous sodium ethoxide. The crude reaction product was then subjected to fractional distillation. At a temperature of from 126° C. to 130° C., under from 0.7 to 1.0 mm. of mercury pressure, 49 grams of ethyl 3-ethoxy-7-hydroxyheptanoate were collected. The product had the following properties: saponification equivalent: 219 (theory: 218.3); molecular weight as determined by hydroxyl analysis: 219.5 (theory: 218.3); elemental analysis in percent by weight:

| | Found | Calculated for $C_{11}H_{22}O_4$ |
|---|---|---|
| C | 60.5 | 60.5 |
| H | 10.4 | 10.2 |

*Example 3*

A solution containing 156 grams of a polymeric ester composition formed of recurring units represented by the general formula:

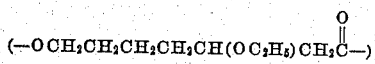

460 grams (10 mols) of ethanol and 6.16 grams (1.0 percent by weight of the reactants) of sodium ethoxide was heated in a sealed autoclave at a temperature of 150° C. and under a pressure of 150 p.s.i.g. for a period of three hours. The polymeric ester composition employed in the reaction had been produced by the reaction of 2-ethoxytetrahydropyran and ketene essentially as described above in Example 1. Upon completion of the reaction period, the basic catalyst was neutralized by the addition of concentrated sulfuric acid and filtered to remove the sodium sulfate precipitate. The crude reaction product was then stripped of ethanol and the residue subjected to fractional distillation. At a temperature of from 140° C. to 142° C., under 1.5 mm. of mercury pressure, 56 grams of ethyl 3-ethoxy-7-hydroxyheptanoate were collected. The product had the following properties: $n_D^{20}$, 1.4429; saponification equivalent: 216.8 (theory, 218.3); elemental analysis in percent by weight:

| | Found | Calculated for $C_{11}H_{22}O_4$ |
|---|---|---|
| C | 60.3 | 60.5 |
| H | 10.3 | 10.2 |

A solution containing 174.6 grams (0.8 mol) of ethyl 3-ethoxy-7-hydroxyheptanoate produced essentially as described above, 35.2 grams (0.88 mol) of sodium hydroxide and 150 cc. of water was heated to a temperature of 75° C. During the reaction, ethanol was produced and continually removed from the reaction mixture. Upon completion of the reaction, as indicated by a cessation of ethanol formation, water was removed from the reaction mixture by distillation. When the temperature of the reaction mixture reached 135° C., the formation of ethanol was again observed. Distillation of the reaction mixture was continued until the temperature of the reaction mixture reached 150° C., at which point 60 grams of a distillate containing approximately equal parts by weight of water and ethanol had been collected. The viscous, yellow-brown residue was diluted with 500 ml. of distilled water, brought to boiling for a period of 10 minutes in the presence of about 0.5 percent by weight of carbon black to improve the color of the product and filtered. The light-yellow filtrate was acidified by the addition of 45 grams of concentrated sulfuric acid. The acidified solution was extracted with two 250-ml. portions of diethyl ether and the ether extracts combined and dried over anhydrous magnesium sulfate. The combined ether extracts were filtered and stripped of ether. The residual product was then subjected to fractional distillation. At a temperature of from 112° C. to 114° C., under 2 mm. of mercury pressure, 92 grams of tetrahydropyran-2-acetic acid were collected. The product had the following properties: melting point: 55° C. to 56° C.; neutralization equivalent: 144.5 (theory, 144.6).

*Example 4*

To 1297 grams (9 mols) of 2-ethoxy-4-methyltetrahydropyran, cooled to a temperature of −10° C., there were added 40 cc. of a 32 percent solution of boron trifluoride in diethyl ether. Two hundred and thirty-seven grams (5.6 mols) of ketene were then bubbled into the solution during a period of 2.5 hours, while maintaining the reaction mixture at a temperature between −10° C. and −3° C. Upon the complete addition of ketene, the acidic catalyst was neutralized by the addition of a solution containing 50 grams of sodium acetate in 300 cc. of water, and the resulting solution agitated for a period of one hour. The amount of ketene absorbed during the reaction was found to be 202.5 grams (4.8 mols). The crude reaction product was stripped of diethyl ether and 245 grams (1.7 mols) of unreacted 2-ethoxy-4-methyltetrahydropyran by steam distillation. The residual product was dissolved in one liter of diisopropyl ether and resulting solution extracted with water several times for the complete removal of the inorganic salts present. Upon stripping diisopropyl ether from the extracted solution and subsequently removing certain neutral, non-saponifiable, low-boiling side-products by distillation at a temperature of from 60° C. to 107° C., under 3 mm. of mercury pressure, a polymeric ester composition was recovered in a 669-gram yield as a viscous, light-yellow oil and had the following properties: saponification equivalent: 183.7 (theory, 186.2); average molecular weight (Menzies-Wright), 1370; viscosity at a temperature of 100° C., 950 centistokes; elemental analysis in percent by weight:

| | Found | Calculated for $(C_{10}H_{18}O_3)_x$ |
|---|---|---|
| C | 64.4 | 64.4 |
| H | 10.2 | 9.8 | indicating a recurring unit structure for the polymeric ester composition represented by the formula:

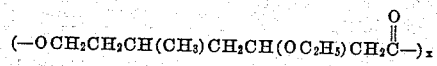

wherein $x$ has an average value of 7.4 as calculated from the determination of average molecular weight.

Example 5

A solution containing 347.5 grams of a polymeric ester composition formed of recurring units represented by the general formula:

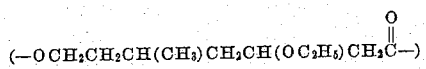

$$(-OCH_2CH_2CH(CH_3)CH_2CH(OC_2H_5)CH_2\overset{O}{\underset{\|}{C}}-)$$

90 grams (2.25 mols) of sodium hydroxide and 470 cc. of water was refluxed for a period of 8 hours at a temperature of about 100° C. The polymeric ester composition employed in the reaction had been produced by the reaction of 288 grams (2.0 mols) of 2-ethoxy-4-methyl-tetrahydropyran and 59.5 grams (1.4 mols) of ketene essentially as described above in Example 4. Upon completion of the reflux period, the resulting solution was diluted with 200 cc. of water and acidified by the addition of 200 cc. of concentrated hydrochloric acid. 3-ethoxy-5-methyl-7-hydroxyheptanoic acid thereupon settled out of solution as a light-yellow oil and was separated. The oily product was thus recovered in a 207.5-gram yield and had the following property: neutralization equivalent, 196 (theory, 204.3).

Example 6

To 858.5 grams (4.25 mols) of 2-ethoxy-6-carbethoxy-tetrahydropyran, cooled to a temperature of −10° C., there were added 13.4 cc. of a 32 percent solution of boron trifluoride in diethyl ether. Eighty-one and one-half grams (1.94 mols) of ketene were then bubbled into the solution during a period of one hour, while maintaining the reaction mixture at a temperature between −10° C. and +10° C. Upon the complete addition of ketene, the acidic catalyst was neutralized by the addition of aqueous sodium acetate. The amount of ketene absorbed during the reaction was found to be 68 grams (1.6 mols). The crude reaction product was diluted with one liter of diisopropyl ether. The organic layer thereby formed was separated and extracted with water to remove the inorganic salts present. The organic product was then stripped of water and diisopropyl ether, after which 510 grams (2.5 mols) of unreacted 2-ethoxy-6-carbethoxy-tetrahydropyran was removed by distillation at a temperature of 180° C., under 0.5 mm. of mercury pressure. The residual product, a polymeric ester composition, was recovered as a viscous, light-yellow liquid and had the following properties: saponification equivalent, 124.7 (theory, 122); viscosity at a temperature of 100° C., 1453 centistokes; average molecular weight, 1740; elemental analysis in percent by weight:

|   | Found | Calculated for $(C_{12}H_{20}O_5)_x$ |
|---|---|---|
| C | 59.1 | 59.0 |
| H | 8.4 | 8.3 | indicating a recurring unit structure for the polymeric ester composition represented by the general formula:

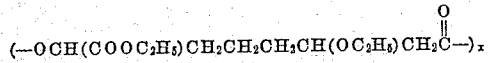

$$(-OCH(COOC_2H_5)CH_2CH_2CH_2CH(OC_2H_5)CH_2\overset{O}{\underset{\|}{C}}-)_x$$

wherein $x$ has an average value of 7.1 as calculated from the determination of average molecular weight.

Example 7

A mixture containing 380 grams of a polymeric ester composition formed of recurring units represented by the general formula:

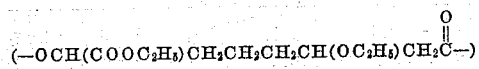

$$(-OCH(COOC_2H_5)CH_2CH_2CH_2CH(OC_2H_5)CH_2\overset{O}{\underset{\|}{C}}-)$$

and 740 grams (3.82 mols) of a 25 percent by weight aqueous sodium hydroxide solution was refluxed for a period of approximately 30 minutes at a temperature of about 100° C. The polymeric ester composition employed in the reaction had been produced by the reaction of 2-ethoxy-6-carbethoxy-tetrahydropyran and ketene essentially as described above in Example 6. Upon completion of the reflux period, the resulting solution was diluted with water to a total volume of about one liter and acidified by the addition of approximately 80 ml. of concentrated sulfuric acid. The acidified solution was filtered to remove the sodium sulfate precipitate and extracted twice with a mixture of isopropyl ketone and ethylene glycol diethyl ether. The extracts were then combined and distilled to remove the isopropyl ketone and ethylene glycol diethyl ether. The residual product, 2-hydroxy-6-ethoxy-octanedioic acid, was recovered in a 165-gram yield as a viscous, water-soluble, colorless hydroscopic oil and had the following property: neutralization equivalent 125 (theory, 117).

Example 8

A solution containing 195 grams of a polymeric ester composition formed of recurring units represented by the general formula:

$$(-OCH(COOC_2H_5)CH_2CH_2CH_2CH(OC_2H_5)CH_2\overset{O}{\underset{\|}{C}}-)$$

368 grams (8 moles) of anhydrous ethanol and 7.8 grams of sodium ethoxide prepared by the previous addition of 2.6 grams of sodium to the ethanol was refluxed for a period of 8 hours at a temperature of 80° C. The polymeric ester composition employed in the reaction had been produced by the reaction of 2-ethoxy-6-carbethoxy-tetrahydropyran and ketene essentially as described above in Example 6. Upon completion of the reflux period, the basic catalyst was neutralized by the addition of 4.1 grams of gaseous hydrogen chloride. The crude reaction product was then stripped of ethanol and subjected to fractional distillation. At a temperature of from 148° C. to 156° C., under a pressure of from 1.0 mm. to 1.5 mm. of mercury, 64 grams of diethyl 2-hydroxy-6-ethoxyoctanedioate were collected as a colorless, sweet-smelling oil. The product had the following properties: no unsaturation; saponification equivalent determined at a temperature of 80° C. in alcoholic potassium hydroxide, 145.0 (theory, 145.2); elemental analysis in percent by weight:

|   | Found | Calculated for $C_{14}H_{26}O_6$ |
|---|---|---|
| C | 57.6 | 57.9 |
| H | 9.0 | 9.2 |

A solution containing 232 grams (1.0 mol) of diethyl 2-hydroxy-6-ethoxyoctanedioate produced essentially as described above, 524 grams (4.0 mols) of 2-ethyl-hexanol and 2.3 grams of metallic sodium dissolved in the alcohol prior to admixture with the ester was heated at a temperature within the range of from 125° C. up to 200° C. for a period of 3 hours. During the reaction, ethanol was produced and continually removed from the reaction mixture. At a temperature of 200° C., the evolution of additional ethanol was observed. Heating was continued at this temperature level until ethanol no longer evolved. The quantity of ethanol collected in this manner amounted to 128 grams. The crude reaction product was distilled at a temperature of from 78° C. to 80° C., under 10 mm. of mercury pressure, whereupon 273 grams (2.1 mols) of unreacted 2-ethylhexanol were removed. The residual product was then subjected to fractional distillation. At a temperature of from 195° C. to 205° C., under a pressure of from 0.5 mm. to 1.5 mm. of mercury, 300 grams of an isomeric mixture containing about 75 percent by weight of the di-2-ethylhexyl ester of 6-carboxytetrahydropyran-2-acetic acid and about 25 percent by weight of the di-2-ethylhexyl ester of 2-hydroxy-6-octenedioic acid. The product had the following properties: saponification equivalent, 201 (theory, 206); free hydroxyl as determined using phthalic anhydride as a reagent, 26 percent by weight; unsaturation, 24 percent by weight; elemental analysis in percent by weight:

|   | Found | Calculated for $C_{24}H_{44}O_5$ |
|---|---|---|
| C | 69.5 | 69.9 |
| H | 10.6 | 10.7 |

The product was subsequently tested and found to be an effective plasticizer for polyvinyl chloride resin.

The invention is susceptible of modification within the scope of the appended claims.

What is claimed is:

1. A process for producing alkoxy-hydroxy substituted carboxylic acids represented by the general formula:

wherein R designates an alkyl radical containing from 1 to about 18 carbon atoms, $R^1$ to $R^8$ designate members of the class consisting of hydrogen and the lower alkyl radicals and Y designates a member of the class consisting of hydrogen and the lower alkyl and carboxylic acid radicals which process comprises saponifying with an alkaline saponification agent and at a temperature of between about 30° C. and about 120° C., a polymeric ester composition produced by condensing ketene and a heterocyclic compound represented by the general formula:

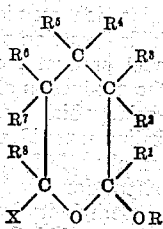

wherein R, $R^1$ to $R^8$ are as defined above and X designates a member of the class consisting of hydrogen, the lower alkyl radicals and the carbalkoxy radicals containing from 2 to about 9 carbon atoms, at a temperature of between about —80° C. and about 100° C. and in the presence of catalytic amounts of an acidic catalyst; acidifying the resultant alkaline saponification reaction mixture; and recovering from the acidified reaction mixture the alkoxy-hydroxy-substituted carboxylic acid product thereby formed.

2. A process for producing alkoxy-hydroxy-substituted carboxylic acid esters represented by the general formula:

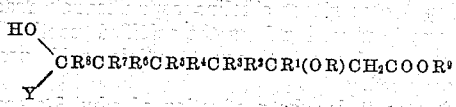

wherein R and $R^9$ designate an alkyl radical, containing from 1 to about 18 carbon atoms, $R^1$ to $R^8$ designate members of the class consisting of hydrogen and the lower alkyl radicals and Y designates a member of the class consisting of hydrogen, the lower alkyl radicals and the carbalkoxy radicals containing from 2 to about 19 carbon atoms, which process comprises transesterifying by reaction with an alkyl alcohol containing from 1 to about 18 carbon atoms in the presence of catalytic amounts of a basic transesterification catalyst and at a temperature of between about 70° C. and about 150° C., a polymeric ester produced by condensing ketene and a heterocyclic compound represented by the general formula:

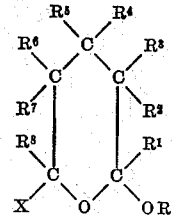

wherein R and $R^1$ to $R^8$ are as defined above and X represents a radical of the class consisting of hydrogen the lower alkyl radicals and the carbalkoxy radicals containing from 2 to about 9 carbon atoms at a temperature of between about —80° C. and about 100° C. and in the presence of catalytic amounts of an acidic catalyst; and recovering from the resultant transesterification reaction mixture the alkoxy-hydroxy-substituted carboxylic acid thereby formed.

3. A process for producing alkoxy-hydroxy-substituted carboxylic acids represented by the general formula:

wherein R designates an alkyl radical containing from 1 to about 18 carbon atoms, $R^1$ to $R^8$ designate members of the class consisting of hydrogen and the lower alkyl radicals and Y designates a member of the class consisting of hydrogen and the lower alkyl radicals, which process comprises saponifying with an alkaline saponification agent and at a temperature of between about 70° C. and about 100° C., a polymeric ester composition produced by condensing ketene and a heterocyclic compound represented by the general formula:

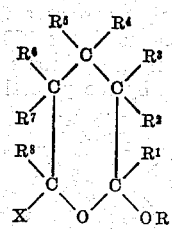

wherein R, and $R^1$ to $R^8$ are as defined above and X designates a member of the class consisting of hydrogen and the lower alkyl radicals, at a temperature of between about —80° C. and about 100° C. and in the presence of catalytic amounts of an acidic catalyst; acidifying the resultant alkaline saponification reaction mixture; and recovering from the acidified reaction mixture the alkoxyhydroxy-substituted carboxylic acid product thereby formed.

4. A process according to claim 3 wherein the alkaline saponification agent is an aqueous alkali metal hydroxide solution.

5. A process for producing alkoxy-hydroxy-substituted carboxylic acids represented by the general formula:

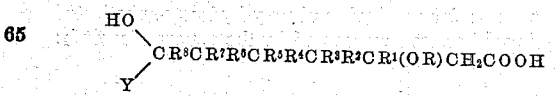

wherein R designates an alkyl radical containing from 1 to about 18 carbon atoms, $R^1$ to $R^8$ designate members of the class consisting of hydrogen and the lower alkyl radicals and Y designates the carboxylic acid radical, which process comprises saponifying with an alkaline saponification agent and at a temperature of between about 70° C. and about 100° C., a polymeric ester composition produced by condensing ketene and a heterocyclic compound represented by the general formula:

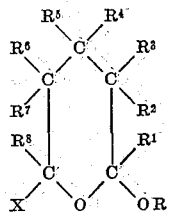

wherein R, and $R^1$ to $R^8$ are as defined above and X designates a carb-alkoxy radical containing from 2 to about 9 carbon atoms, at a temperature of between about —80° C. and about 100° C. and in the presence of catalytic amounts of an acidic catalyst; acidifying the resultant alkaline saponification reaction mixture; and recovering from the acidified reaction mixture the alkoxy-hydroxy-substituted carboxylic acid product thereby formed.

6. A process according to claim 5 wherein the alkaline saponification agent is an aqueous alkali metal hydroxide solution.

7. A process for producing alkoxy-hydroxy-substituted carboxylic acid esters represented by the general formula:

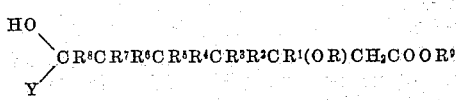

wherein R and $R^9$ designate an alkyl radical containing from 1 to about 18 carbon atoms, $R^1$ to $R^8$ designate members of the class consisting of hydrogen and the lower alkyl radicals and Y designates a member of the class consisting of hydrogen and the lower alkyl radicals, which process comprises transesterifying by reaction with an alkyl alcohol containing from 1 to about 18 carbon atoms in the presence of catalytic amounts of a basic transesterification catalyst and at a temperature of between about 120° C. and about 150° C., a polymeric ester produced by condensing ketene and a heterocyclic compound represented by the general formula:

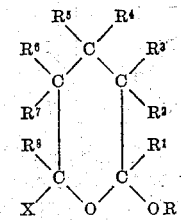

wherein R and $R^1$ to $R^8$ are as defined above and X represents a radical of the class consisting of hydrogen, the lower alkyl radicals and the carbalkoxy radicals containing from 2 to about 9 carbon atoms at a temperature of between about —80° C. and about 100° C. and in the presence of catalytic amounts of an acidic catalyst; and recovering from the resultant transesterification reaction mixture the alkoxy-hydroxy-substituted carboxylic acid thereby formed.

8. A process according to claim 7 wherein the basic transesterification catalyst is an alkali metal alkoxide.

9. A process for producing alkoxy-hydroxy-substituted carboxylic acid esters represented by the general formula:

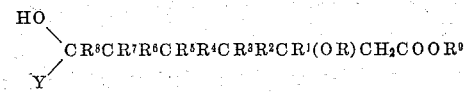

wherein R and $R^9$ designate an alkyl radical containing from 1 to about 18 carbon atoms, $R^1$ to $R^8$ designate members of the class consisting of hydrogen and the lower alkyl radicals and Y designates a carbalkoxy radical containing from 2 to about 19 carbon atoms, which process comprises transesterifying by reaction with an alkyl alcohol containing from 1 to about 18 carbon atoms in the presence of a basic transesterification catalyst and at a temperature of between about 120° C. and about 150° C., a polymeric ester produced by condensing ketene and a heterocyclic compound represented by the general formula:

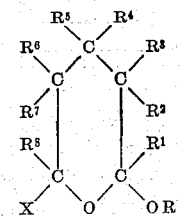

wherein R and $R^1$ to $R^8$ are as defined above and X represents a carbalkoxy radical containing from 2 to about 9 carbon atoms, at a temperature of between about —80° C. and about 100° C. and in the presence of catalytic amounts of an acidic catalyst; and recovering from the resultant transesterification reaction mixture the alkoxy - hydroxy - substituted carboxylic acid thereby formed.

10. A process according to claim 9 wherein the basic transesterification catalyst is an alkali metal hydroxide.

11. A process for the production of 3-ethoxy-7-hydroxyheptanoic acid, which process comprises saponifying with an alkaline saponification agent and at a temperature of between about 30° C. and about 120° C., a polymeric ester composition produced by condensing ketene and 2-ethoxytetrahydropyran at a temperature of between about —80° C. and about 100° C. and in the presence of catalytic amounts of an acidic catalyst; acidifying the resultant alkaline saponification reaction mixture; and recovering from the acidified reaction mixture the 3-ethoxy-7-hydroxyheptanoic acid product thereby formed.

12. A process for the production of 3-ethoxy-5-methyl-7-hydroxy-heptanoic acid, which process comprises saponifying with an alkaline saponification agent and at a temperature of between about 30° C. and about 120° C., a polymeric ester composition produced by condensing ketene and 2-ethoxy-4-methyl-tetrahydropyran at a temperature of between about —80° C. and about 100° C. and in the presence of catalytic amounts of an acidic catalyst; acidifying the resultant alkaline saponification reaction mixture; and recovering from the acidified reaction mixture the 3-ethoxy-5-methyl-7-hydroxyheptanoic acid product thereby formed.

13. A process for the production of 2-hydroxy-6-ethoxyoctanedioic acid, which process comprises saponifying with an alkaline saponification agent and at a temperature of between about 30° C. and about 120° C., a polymeric ester composition produced by condensing ketene and 2-ethoxy-6-carbethoxy-tetrahydropyran at a temperature of between about —80° C. and about 100° C. and in the presence of catalytic amounts of an acidic catalyst; acidifying the resultant alkaline saponification reaction mixture; and recovering from the acidified reaction mixture the 2-hydroxy-6-ethoxyoctanedioic acid product thereby formed.

14. A process for the production of ethyl 3-ethoxy-7-hydroxy-heptanoate, which process comprises transesterifying by reaction with ethanol in the presence of catalytic amounts of a basic transesterification catalyst and at a temperature of between about 70° C. and about 150° C., a polymeric ester produced by condensing ketene and 2-ethoxytetrahydropyran at a temperature of between about —80° C. and about 100° C. and in the presence of catalytic amounts of an acidic catalyst; and recovering from the resultant transesterification reaction mixture the ethyl 3-ethoxy-7-hydroxy - heptanoate product thereby formed.

15. A process for the production of diethyl 2-hydroxy-6-ethoxy-octanedioate which process comprises transesterifying by reaction with ethanol in the presence of catalytic amounts of a basic transesterification catalyst and at a temperature of between about 70° C. and about 150° C., a polymeric ester produced by condensing ketene and 2-ethoxy-6-carbethoxytetrahydropyran at a temperature of between about −80° C. and about 100° C. and in the presence of catalytic amounts of an acidic catalyst; and recovering from the resultant transesterification reaction mixture the diethyl 2-hydroxy-6-ethoxyoctanedioate product thereby formed.

16. As compositions of matter, compounds selected from the group consisting of alkoxy-hydroxy-substituted carboxylic acids and carboxylic acid esters represented by the general formula:

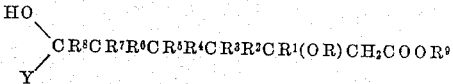

wherein R designates an alkyl radical containing from 1 to about 18 carbon atoms, $R^1$ to $R^8$ designate members of the class consisting of hydrogen and the lower alkyl radicals, $R^9$ designates a member of the class consisting of hydrogen and the alkyl radicals containing from 1 to about 18 carbon atoms, Y designates a member of the class consisting of hydrogen, the lower alkyl radicals, the carbalkoxy radicals containing from 2 to about 19 carbon atoms and the carboxylic acid radical, and wherein when Y designates a carbalkoxy radical, $R^9$ designates an alkyl radical, and when Y designates the carboxylic acid radical, $R^9$ designates hydrogen.

17. As compositions of matter, 3-alkoxy-7-hydroxyheptanoic acids.

18. As a composition of matter, 3-ethoxy-7-hydroxyheptanoic acid.

19. As a composition of matter, 3-ethoxy-5-methyl-7-hydroxyheptanoic acid.

20. As compositions of matter, 2-hydroxy-6-alkoxyoctanedioic acids.

21. As a composition of matter, 2-hydroxy-6-ethoxyoctanedioic acid.

22. As compositions of matter, alkyl esters of 3-alkoxy-7-hydroxyheptanoic acids.

23. As a composition of matter, ethyl 3-ethoxy-7-hydroxy-heptanoate.

24. As compositions of matter, dialkyl diesters of 2-hydoxy-6-alkoxyoctanedioic acids.

25. As a composition of matter, diethyl 2-hydroxy-6-ethoxyoctanedioate.

No references cited.